(12) United States Patent
Nayak et al.

(10) Patent No.: US 11,361,040 B2
(45) Date of Patent: Jun. 14, 2022

(54) SYSTEMS AND METHODS FOR PROVIDING PERSONA-ADJUSTED DATA

(71) Applicant: Johnson Controls Tyco IP Holdings LLP, Milwaukee, WI (US)

(72) Inventors: Rajesh C. Nayak, Manipal (IN); Sudhi R. Sinha, Milwaukee, WI (US); Subrata Bhattacharya, Mumbai (IN); Tulshiram Vitthalrao Waghmare, Pune (IN); Abhigyan Chatterjee, Asansol (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 184 days.

(21) Appl. No.: 16/275,257

(22) Filed: Feb. 13, 2019

(65) Prior Publication Data
US 2020/0226191 A1 Jul. 16, 2020

Related U.S. Application Data

(60) Provisional application No. 62/791,730, filed on Jan. 11, 2019.

(51) Int. Cl.
*G06F 16/9535* (2019.01)
*G06F 3/04842* (2022.01)
(Continued)

(52) U.S. Cl.
CPC ...... *G06F 16/9535* (2019.01); *G06F 3/04842* (2013.01); *G06F 9/451* (2018.02);
(Continued)

(58) Field of Classification Search
CPC ............ G06F 16/9535; G06F 3/04842; G06F 16/9538; G06F 9/451; G06F 16/9532; G06Q 10/063112
(Continued)

(56) References Cited

U.S. PATENT DOCUMENTS 6,389,331 B1 * 5/2002 Jensen ............... G05B 23/0213
700/275
8,862,597 B2 * 10/2014 Barak ................. G06F 16/9535
707/754
(Continued)

FOREIGN PATENT DOCUMENTS

EP 3 163 522 A1 5/2017

OTHER PUBLICATIONS

International Search Report and Written Opinion on PCT/US2020/012535, dated Mar. 17, 2020, 14 pages.

*Primary Examiner* — Phuong Thao Cao
(74) *Attorney, Agent, or Firm* — Foley & Lardner LLP

(57) ABSTRACT

A method for providing one or more persona-adjusted search suggestions is disclosed. The method includes identifying a role of a user that is associated with one or more duties and performance indicators for one or more buildings. The method includes associating the role of the user with at least one of a physical space, a web page, and one or more assets associated with the physical space. The method includes filtering data associated with the one or more buildings based on the role of the user and the at least one of the physical space, the web page, and the one or more assets. The method includes displaying the filtered data on a user interface as one or more search suggestions to the user.

20 Claims, 12 Drawing Sheets

(51) Int. Cl.
  *G06F 16/9538* (2019.01)
  *G06Q 10/06* (2012.01)
  *G06F 9/451* (2018.01)
  *G06F 16/9532* (2019.01)

(52) U.S. Cl.
  CPC ...... *G06F 16/9532* (2019.01); *G06F 16/9538* (2019.01); *G06Q 10/063112* (2013.01)

(58) Field of Classification Search
  USPC .......................................................... 707/722
  See application file for complete search history.

(56) References Cited

U.S. PATENT DOCUMENTS

| | | | | |
|---|---|---|---|---|
| 9,026,563 | B2* | 5/2015 | Juillard | G06F 16/972 707/803 |
| 9,058,353 | B2* | 6/2015 | Muller | G06F 16/24549 |
| 10,289,107 | B2* | 5/2019 | Warner | G05B 15/02 |
| 10,528,021 | B2* | 1/2020 | Billi | G06Q 10/0639 |
| 2003/0229549 | A1* | 12/2003 | Wolinsky | G06Q 30/0248 705/14.61 |
| 2003/0229607 | A1* | 12/2003 | Zellweger | G06F 40/183 |
| 2005/0273346 | A1* | 12/2005 | Frost | G06Q 50/167 705/316 |
| 2006/0010388 | A1* | 1/2006 | Imhof | G05B 15/02 715/734 |
| 2007/0174083 | A1* | 7/2007 | Silverman | G06Q 30/0645 705/1.1 |
| 2009/0024979 | A1* | 1/2009 | Chessell | G06F 9/451 717/104 |
| 2009/0217352 | A1* | 8/2009 | Shen | G06F 21/6218 726/3 |
| 2010/0043074 | A1* | 2/2010 | Scates | G06Q 10/0637 726/25 |
| 2010/0145954 | A1* | 6/2010 | Barlin | G06F 16/9537 707/754 |
| 2010/0241443 | A1* | 9/2010 | Becker | G16H 40/20 705/2 |
| 2011/0047418 | A1 | 2/2011 | Drees et al. | |
| 2011/0099168 | A1* | 4/2011 | Boyer | G06F 16/90335 707/E17.071 |
| 2011/0137945 | A1* | 6/2011 | Sandblom | G06F 30/13 707/783 |
| 2011/0145933 | A1* | 6/2011 | Gambhir | G06F 9/547 726/30 |
| 2011/0213789 | A1* | 9/2011 | Doshi | G06F 21/6218 707/754 |
| 2011/0265188 | A1* | 10/2011 | Ramaswamy | G06F 21/00 726/28 |
| 2012/0022907 | A1* | 1/2012 | Fidler | G06Q 10/06 705/7.14 |
| 2012/0166466 | A1* | 6/2012 | Slater | G16Z 99/00 707/E17.074 |
| 2012/0259466 | A1* | 10/2012 | Ray | G05B 15/02 700/275 |
| 2013/0073964 | A1* | 3/2013 | Meaney | G11B 27/34 715/716 |
| 2013/0091088 | A1* | 4/2013 | Forman | G06F 16/355 706/54 |
| 2013/0166577 | A1* | 6/2013 | Barak | G06F 16/9535 707/754 |
| 2014/0157350 | A1* | 6/2014 | Wang | G06F 21/6218 726/1 |
| 2014/0172486 | A1* | 6/2014 | Kwan | G06Q 10/063118 705/7.17 |
| 2014/0229874 | A1* | 8/2014 | Strauss | G06Q 50/08 715/771 |
| 2014/0249855 | A1* | 9/2014 | Moore | G16H 15/00 705/3 |
| 2014/0282199 | A1* | 9/2014 | Basu | G06Q 10/0633 715/772 |
| 2015/0105878 | A1* | 4/2015 | Jones | G06F 9/44505 700/83 |
| 2015/0120763 | A1* | 4/2015 | Grue | G06F 16/24 707/754 |
| 2015/0120951 | A1* | 4/2015 | Wilson | H04L 43/08 709/229 |
| 2016/0117785 | A1* | 4/2016 | Lerick | G06Q 30/012 705/305 |
| 2016/0132595 | A1* | 5/2016 | Bliss | G06F 16/2228 707/706 |
| 2016/0285707 | A1* | 9/2016 | Pawlowski | G06F 3/04842 |
| 2016/0292279 | A1* | 10/2016 | Murphy | G06F 16/9535 |
| 2016/0292895 | A1* | 10/2016 | Billi | G06T 11/60 |
| 2016/0335731 | A1* | 11/2016 | Hall | G06Q 10/067 |
| 2016/0364681 | A1* | 12/2016 | Andrus | G06Q 10/087 |
| 2017/0052536 | A1* | 2/2017 | Warner | G05B 23/0224 |
| 2017/0053222 | A1* | 2/2017 | Shani | G06Q 10/06313 |
| 2017/0123397 | A1* | 5/2017 | Billi | G06Q 10/063 |
| 2017/0212482 | A1* | 7/2017 | Boettcher | H02J 13/00004 |
| 2017/0321923 | A1* | 11/2017 | Wiens-Kind | G05B 19/042 |
| 2017/0329292 | A1* | 11/2017 | Piaskowski | G06Q 10/00 |
| 2018/0011461 | A1* | 1/2018 | Camarasa | G06F 3/0482 |
| 2018/0052675 | A1* | 2/2018 | Ghosh | G06F 8/65 |
| 2018/0181716 | A1* | 6/2018 | Mander | G06Q 10/0633 |
| 2018/0213361 | A1* | 7/2018 | Venkat | H04W 4/029 |
| 2018/0247023 | A1* | 8/2018 | Divine | G06T 11/60 |
| 2018/0259934 | A1* | 9/2018 | Piaskowski | G05B 15/02 |
| 2018/0365785 | A1* | 12/2018 | Boss | G06Q 10/063112 |
| 2019/0129575 | A1* | 5/2019 | Wang | G06F 9/461 |
| 2019/0132329 | A1* | 5/2019 | Verberkt | G06Q 10/06 |
| 2019/0294018 | A1* | 9/2019 | Shrivastava | G02F 1/163 |
| 2020/0003448 | A1* | 1/2020 | Schwegler | F24F 11/39 |
| 2020/0082307 | A1* | 3/2020 | Haze | G06N 5/022 |
| 2020/0193364 | A1* | 6/2020 | Wilson, Jr. | G06F 21/31 |
| 2020/0226191 | A1* | 7/2020 | Nayak | G06F 16/9538 |
| 2020/0226524 | A1* | 7/2020 | Bhattacharya | G06F 3/0482 |

* cited by examiner

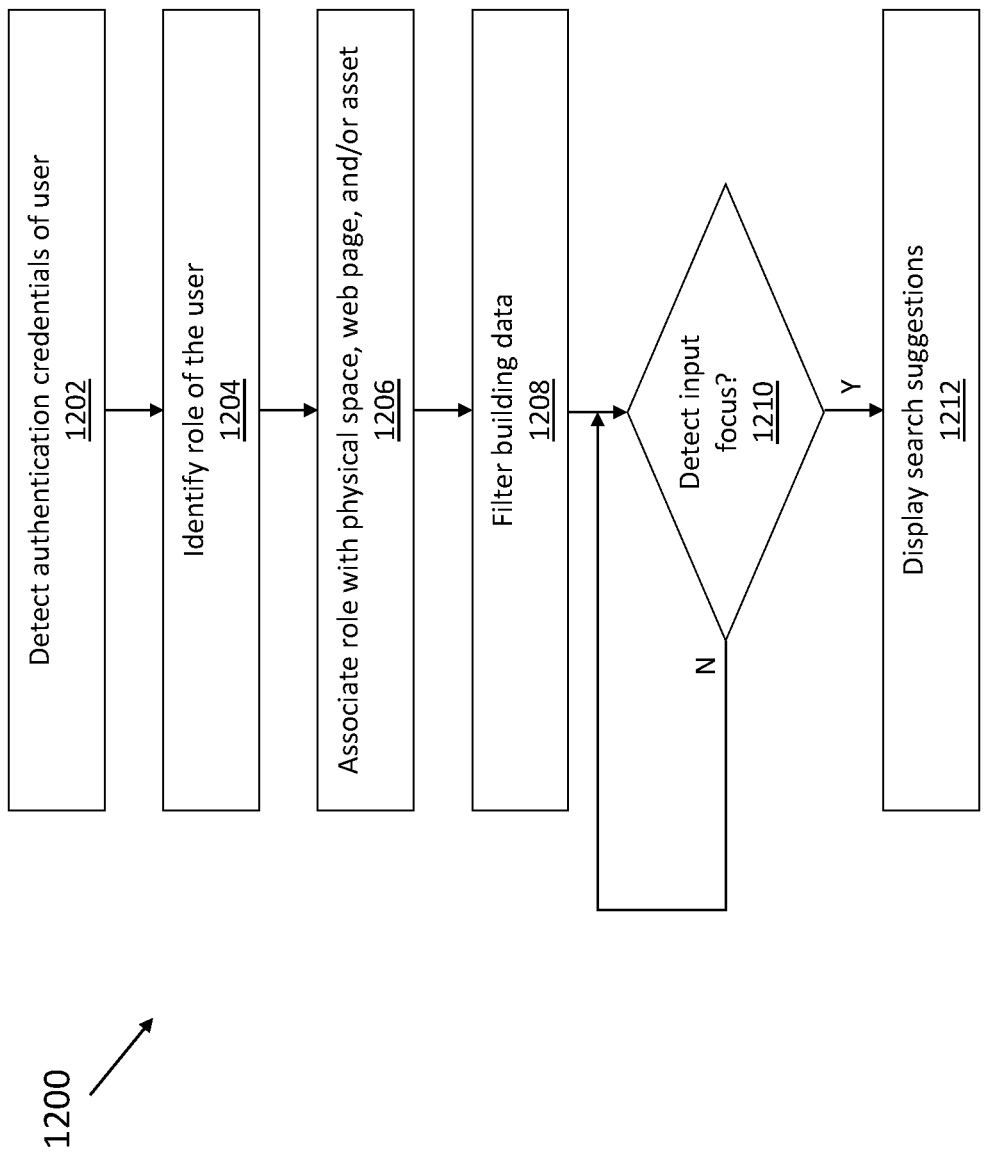

SYSTEMS AND METHODS FOR PROVIDING PERSONA-ADJUSTED DATA

CROSS-REFERENCE TO RELATED APPLICATION

The present application claims priority to U.S. Provisional Patent Application No. 62/791,730, filed on Jan. 11, 2019, which is incorporated by reference herein in its entirety.

TECHNICAL FIELD

The present disclosure relates generally to a building management system and more particularly to a building management system that manages various data associated with one or more buildings, and allows each of a number of users to be presented with a persona-adjusted set of building management data.

BACKGROUND

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof. As the number of BMS devices used in various sectors increases, the amount of data being produced and collected has been increasing exponentially. Accordingly, effective analysis and information management of a plethora of collected data is desired.

BRIEF SUMMARY

In one aspect, this disclosure is directed to a method for providing one or more persona-adjusted search suggestions. The method includes identifying a role of a user that is associated with one or more duties and performance indicators for one or more buildings. The method includes associating the role of the user with at least one of a physical space, a web page, and one or more assets associated with the physical space. The method includes filtering data associated with the one or more buildings based on the role of the user and the at least one of the physical space, the web page, and the one or more assets. The method includes displaying the filtered data on a user interface as one or more search suggestions to the user.

In some embodiments, the method further includes detecting a presence of authentication credentials of the user inputted to the user interface to identify the role of the user.

In some embodiments, the method further includes detecting an input focus on an input element of the user interface to display the filtered data.

In some embodiments, the input focus includes one or more searched items correspond to the one or more search suggestions.

In some embodiments, the input focus includes a presence of a cursor, the method further comprise detecting the presence of the cursor that has stayed in the input element for a length of time greater than a predefined threshold.

In some embodiments, the method further includes associating one or more faults with the role of the user and/or one or more of the physical space, the web page, and the one or more assets, and displaying the one or more faults on the user interface prior to displaying the one or more search suggestions.

In some embodiments, the method further includes filtering the data associated with the building based on one or more frequently used entries associated with the user.

In another aspect, this disclosure is directed to a computing device. The computing device includes a memory and one or more processors operatively coupled to the memory. The one or more processors are configured to identify a role of a user that is associated with one or more duties and performance indicators for one or more buildings. The one or more processors are configured to associate the role of the user with at least one of a physical space, a web page, and one or more assets associated with the physical space. The one or more processors are configured to filter data associated with the one or more buildings based on the role of the user and the at least one of the physical space, the web page, and the one or more assets. The one or more processor are configured to display the filtered data on a user interface as one or more search suggestions to the user.

In some embodiments, the one or more processor are further configured to detect a presence of authentication credentials of the user inputted to the user interface to identify the role of the user.

In some embodiments, the one or more processor are further configured to detect an input focus on an input element of the user interface to display the filtered data.

In some embodiments, the input focus includes one or more searched items correspond to the one or more search suggestions.

In some embodiments, the input focus includes a presence of a cursor, the method further comprise detecting the presence of the cursor that has stayed in the input element for a length of time greater than a predefined threshold.

In some embodiments, the one or more processor are further configured to associate one or more faults with the role of the user and/or one or more of the physical space, the web page, and the one or more assets, and display the one or more faults on the user interface prior to displaying the one or more search suggestions.

In yet another aspect, this disclosure is directed to a non-transitory computer readable medium storing program instructions. The program instructions cause one or more processors to identify a role of a user that is associated with one or more duties and performance indicators for one or more buildings. The program instructions cause the one or more processors to associate the role of the user with at least one of a physical space, a web page, and one or more assets associated with the physical space. The program instructions cause the one or more processors to filter data associated with the one or more buildings based on the role of the user and the at least one of the physical space, the web page, and the one or more assets. The program instructions cause the one or more processors to display the filtered data on a user interface as one or more search suggestions to the user.

In some embodiments, the program instructions further cause the one or more processors to detect a presence of authentication credentials of the user inputted to the user interface to identify the role of the user.

In some embodiments, the program instructions further cause the one or more processors to detect an input focus on an input element of the user interface to display the filtered data.

In some embodiments, the input focus includes one or more searched items correspond to the one or more search suggestions.

In some embodiments, the input focus includes a presence of a cursor, the method further comprise detecting the presence of the cursor that has stayed in the input element for a length of time greater than a predefined threshold.

In some embodiments, the program instructions further cause the one or more processors to associate one or more faults with the role of the user and/or one or more of the physical space, the web page, and the one or more assets, and display the one or more faults on the user interface prior to displaying the one or more search suggestions.

In some embodiments, the program instructions further cause the one or more processors to filter the data associated with the building based on one or more frequently used entries associated with the user.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 12 is a flow diagram of a method for providing one or more persona-adjusted search suggestions, according to an exemplary embodiment.

DETAILED DESCRIPTION

Figure 1:
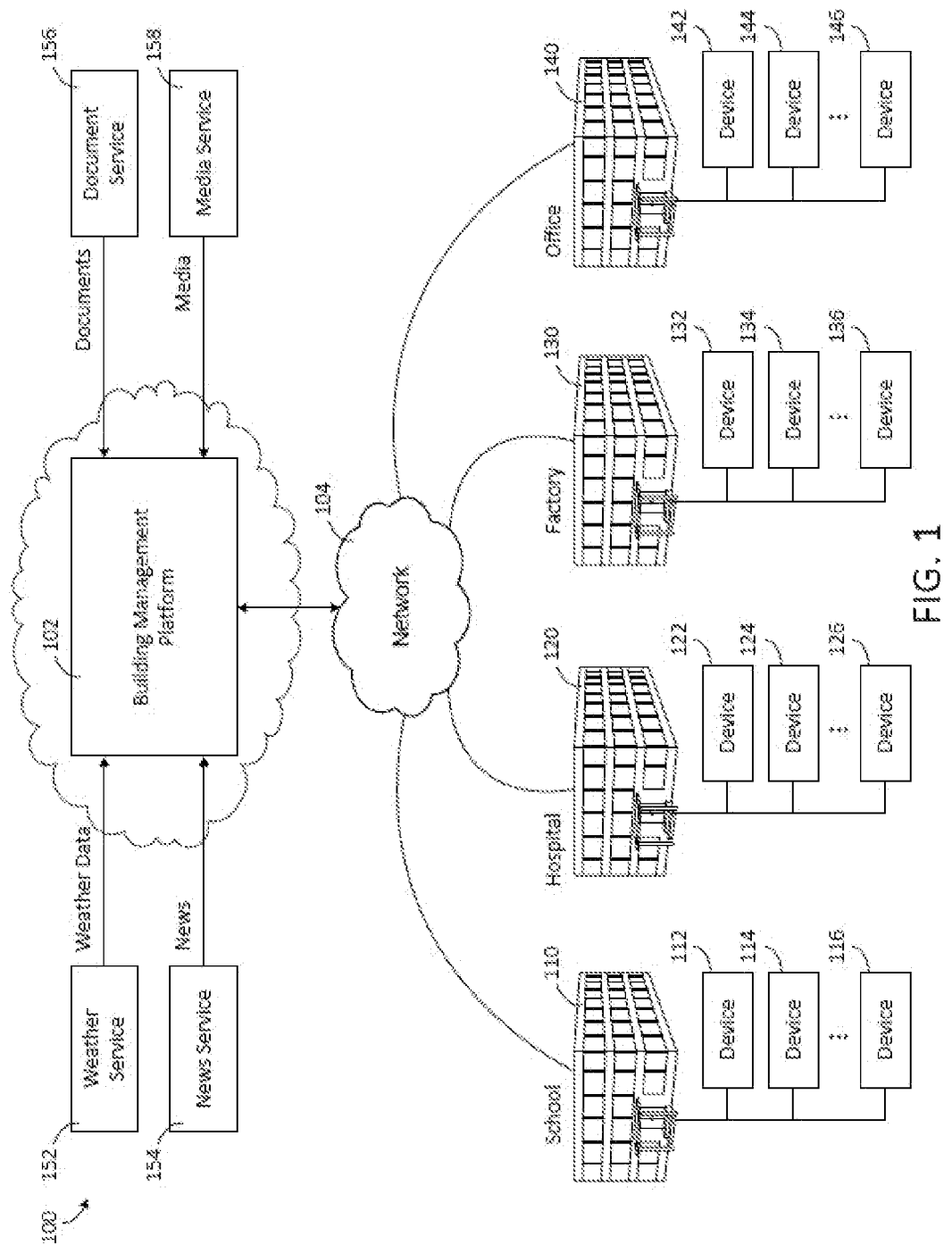
FIG. 1 is a block diagram of a smart building environment, according to an exemplary embodiment.

As the number of various entities (e.g., spaces, assets, users etc.) of a building increases, the size of data associated with the various entities becomes significantly large. To navigate and identify information through the data becomes a challenge. To tackle this problem, a number of exiting building analytics/data platforms provide a search function. However, such existing building analytics/data platforms typically rely on text matching mechanisms, which limits the search results to one or more lists and/or tables and lacks hierarchical search results. Further, users are generally required to enter exact searched item in a search field to discover the desired results.

In general, the existing building analytics/data platforms have several disadvantages. For example, the search suggestion provided by the existing building analytics/data platforms is not based on context. When a user types a word in a search field, the suggestions are based on text matching mechanisms. As such, the user has a non-intuitive experience and the searching becomes more of an exercise rather than simplification of identifying results. In another example, in the buildings industry, each person serves one or more respective duties in a respective organization. Such duties are closely related to the role of each of the persons. The existing building analytics/data platforms generally do not provide search results based on such a role, which causes the searching to become a time-consuming activity if the exact intended target in unknown.

The present disclosure provides various embodiments of a building management system coupled with a search suggestion platform that provides one or more search suggestions based on a multi-dimensional matrix relationship to provide various advantages over the existing building analytics/data platforms. For example, the search suggestion platform allows a user to be presented with the search suggestions before the user intends to define a search criteria (e.g., inputting a searched item). In another example, the search suggestion platform can provide a user with one or more search suggestions in line with what the user expects and are closely related to a role of the user. In yet another example, the search suggestion platform can redefine the user experience that a data analytics platform could ever provide by providing closely related search suggestions that the user actually wants to view and/or search, thereby giving an impression that the disclosed platform understands the user. In yet another example, the disclosed search suggestion platform can be universally applied across various data analytics platforms, with the dimensions and boundaries of services identified.

In some embodiments, the search suggestion platform uses at least one of the following conditions or dimensions to provide each user (e.g., a technician maintaining a certain area of a building) with one or more persona-adjusted search suggestions: a role of the user (or a persona of the user), a physical space, a page, and assets/account/information entity associated with the physical space. For example, based on the role of the user, the search suggestion platform can retrieve the profile of the user who has logged into the search suggestion platform to present one or more search suggestions that the user actually wishes to discover. Using the physical space, which can include a space to which the user has accessed and/or in which the user is currently located, the search suggestion platform can provide one or more space-based search suggestions. Using the page, which can include a web page of a user interface in which the user is currently viewing, the search suggestion platform can provide one or more page-based search suggestions. Using the assets/account/information entity associated with the physical space, the search suggestion platform can provide even more accurate search suggestions beyond the space-based search suggestions.

The search suggestion platform can use the above-identified dimensions, either alone or in permutation/combination, to generate a filter criteria (e.g., a matrix) to provide search suggestions closed related to the user. As such, the user can discover desired search results in a faster and more intuitive way. New users can get acquainted to the search suggestion platform relatively easily and achieve their intended tasks in a very productive manner. Moreover, the search suggestions can evolve over time by showing most frequently searched items, deprioritized unused search suggestions/recommendations.

In some embodiments, the search suggestion platform may provide one or more user interfaces (e.g., GUIs) that includes a field for a user to fill out a role or user persona of the user. Thus, when the search suggestion platform identifies a user creating a profile in the search suggestion platform, the search suggestion may identify the role or user persona of the user from the respective profile. Examples of the role of a user of the search suggestion platform can include the followings: a location manager (e.g., a manager of a particular building/facility/factory/floor), a location director (e.g., a director of a particular building/facility/factory/floor), a portfolio owner, a finance manager, a sustainability manager, a maintenance manager, a building service provider, an occupant, a tenant, and a visitor. After the search suggestion platform identifies the respective roles of the users, the search suggestion platform can associate each user with the respective duty for an organization and one or more primary key performance indicators (KPIs) in which the user may be interested. Below is a table listing respective duties and KPIs of a number of example roles.

| User Persona/Role | Duties | Primary KPIs |
|---|---|---|
| Portfolio owner | Get an overview understanding of the financial and operating conditions of the portfolio and individual buildings within that portfolio to determine how the investment is performing. | Facility productivity (revenue)<br>Net present value of asset<br>Facility utilization<br>Budget performance: planned vs actual operating budget (energy + maintenance)<br>Efficiency drain (monetized FDD)<br>Occupant satisfaction<br>Project tracking<br>Major events<br>Major incidents<br>Compliance scores |
| Facility/Location director | Understand usage, environmental factors, financial performance, and productivity of the facility to determine how the facility is contributing to the mission of the organization | People productivity<br>Space utilization<br>Indoor environment (temp, humidity, VOC, sound, light)<br>Budget performance<br>Efficiency drains<br>People and asset layout<br>Major events<br>Major incidents<br>Compliance score |
| Facility/Location manager | Understand how the facility is being used<br>Manage energy - review consumption, project trends, identify leakages, track improvements<br>Understand operating conditions and performance of various equipment and systems in the building<br>Manage and optimize HVAC central plants, airside systems, and other HVAC equipment<br>Manage maintenance activities<br>Performance tenant billing and reconciliation<br>Manage compliance and reporting | Budget performance<br>Space utilization<br>Energy performance<br>Asset utilization<br>Asset performance<br>People and asset layout<br>Efficiency drains<br>Work order management metrics - open, close, longest, average, etc.<br>Compliance score<br>Sustainability score<br>Indoor environment<br>Service team utilization<br>Tenant billing and reconciliation<br>Utility bill reconciliation |
| Sustainability manager | Understand the sustainability performance<br>Manage sustainability improvement initiatives<br>Performance compliance and reporting<br>Drive education and socialization | Sustainability score<br>Energy utilization index<br>Energy performance<br>Project tracking<br>Compliance reporting<br>Sustainability score |
| Maintenance manager | Understand the presence, usage, and performance of various assets in the building<br>Manage maintenance events | Asset layout<br>Budget performance<br>Energy performance<br>Asset performance<br>Efficiency drains<br>Work order management<br>Open occupant complaints |
| Finance manager | Understand the financial performance of the facility<br>Manage financial allocations and recoveries | Budget performance<br>Net present value of asset<br>Tenant billing and reconciliation |

| User Persona/Role | Duties | Primary KPIs |
|---|---|---|
| | | Utility bill and reconciliation |
| Occupant/Tenant | Understand the indoor environment | Occupant experience feedback |
| | Personalize local environment | Space Utilization |
| | Schedule facilities like conference rooms, labs, etc. | Indoor Temperature, Humidity |
| | Be informed of major events and incidents including facility maintenance events | |
| | Find way around in the facility | |
| | Understand the various sustainability initiatives and performance being undertaken | |
| Building service provider | Understand asset performance | Work order management |
| | Understand scopes of work to be executed for building services with back-up data | Asset performance Service team utilization |
| | Manage service teams | |

In response to the search suggestion platform identifying that the user logs into the search suggestion platform, the search suggestion platform can associate the profile of the user, managed by the search suggestion platform, with the user to identify the role of the user, and can use one or more other dimensions (e.g., the physical space, the page, the asset(s), etc.) to provide one or more search suggestions. In some embodiments, the search suggestion platform can provide the search suggestions responsive to a role of the user being identified and the search suggestion platform detecting that user enters one or more searched items into a search filed of the platform, or provide the search suggestions responsive to a role of the user being identified and the search suggestion platform detecting that user places a cursor (e.g., a mouse cursor) in a search filed of the platform (e.g., prior to entering any searched item). Various examples illustrating the search suggestions that the search suggestion platform can provide based on one or more of the other dimensions shall be described in the process flows of FIGS. 7, 8, 9, and 10, respectively.

Hereinafter, example embodiments will be described in more detail with reference to the accompanying drawings. FIG. 1 is a block diagram of a smart building environment 100, according to some exemplary embodiments. Smart building environment 100 is shown to include a building management platform 102. Building management platform 102 can be configured to collect data from a variety of different data sources. For example, building management platform 102 is shown collecting data from buildings 110, 120, 130, and 140. For example, the buildings may include a school 110, a hospital 120, a factory 130, an office building 140, and/or the like. However the present disclosure is not limited to the number or types of buildings 110, 120, 130, and 140 shown in FIG. 1. For example, in some embodiments, building management platform 102 may be configured to collect data from one or more buildings, and the one or more buildings may be the same type of building, or may include one or more different types of buildings than that shown in FIG. 1.

Building management platform 102 can be configured to collect data from a variety of devices 112-116, 122-126, 132-136, and 142-146, either directly (e.g., directly via network 104) or indirectly (e.g., via systems or applications in the buildings 110, 120, 130, 140). In some embodiments, devices 112-116, 122-126, 132-136, and 142-146 are internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio (AFR) meters, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, Light Detection And Ranging (LIDAR) sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, complementary metal-oxide-semiconductor (CMOS) sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 stores sensor data using data entities. Each data entity may correspond to a particular sensor and may include a timeseries of data values received from the corresponding sensor. In some embodiments, building management platform 102 stores relational entities that define relationships between sensor object entities and the corresponding data entity. For example, each relational entity may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158

(hereinafter referred to collectively as 3$^{rd}$ party services). In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the Internet, a cellular network, etc.). Building management platform 102 can process and transform collected data to generate timeseries data and entity data. Several features of building management platform 102 are described in more detail below.

Building HVAC Systems and Building Management Systems

Figure 2:
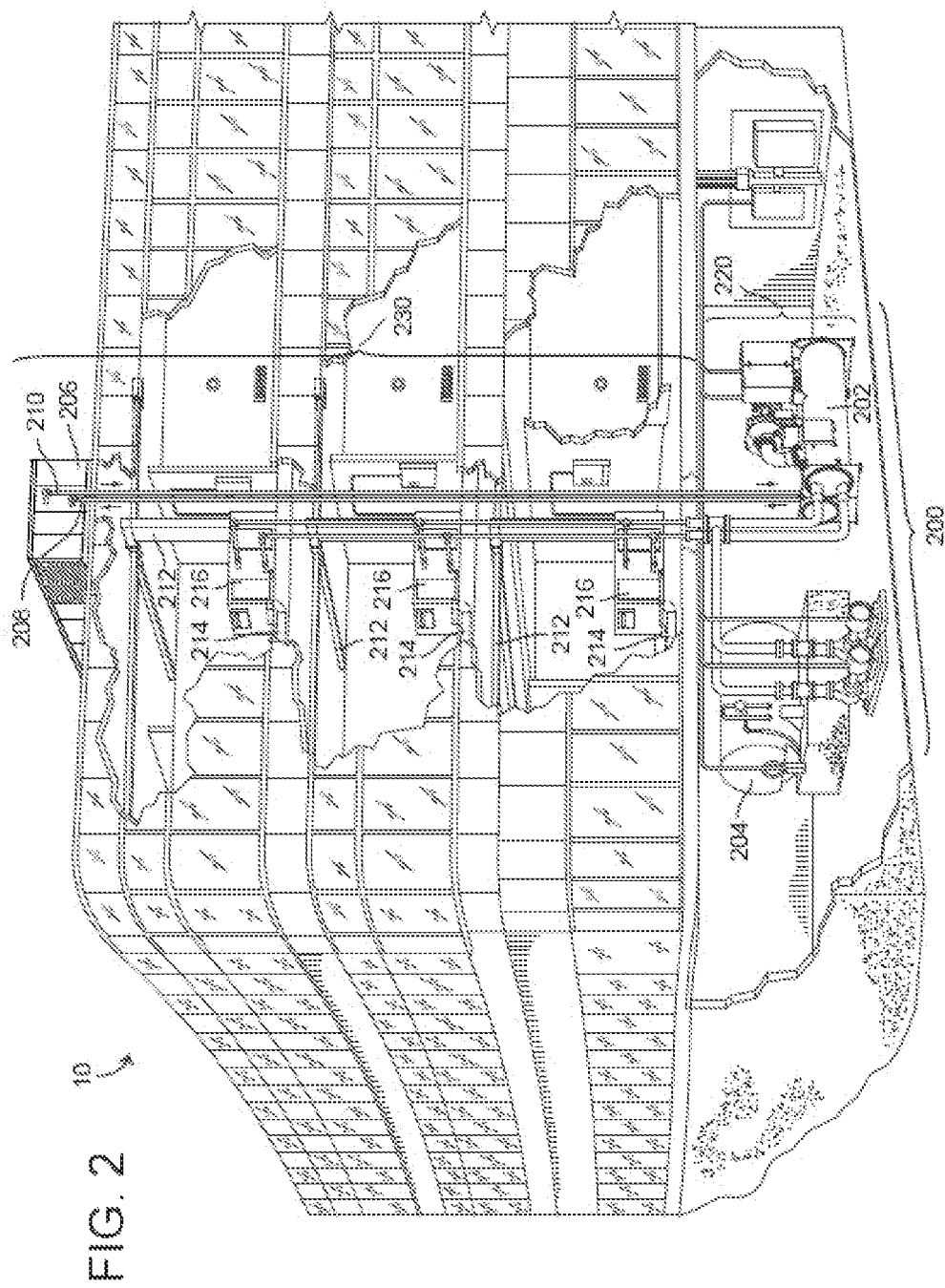
FIG. 2 is a perspective view of a smart building, according to an exemplary embodiment.
Figure 3:
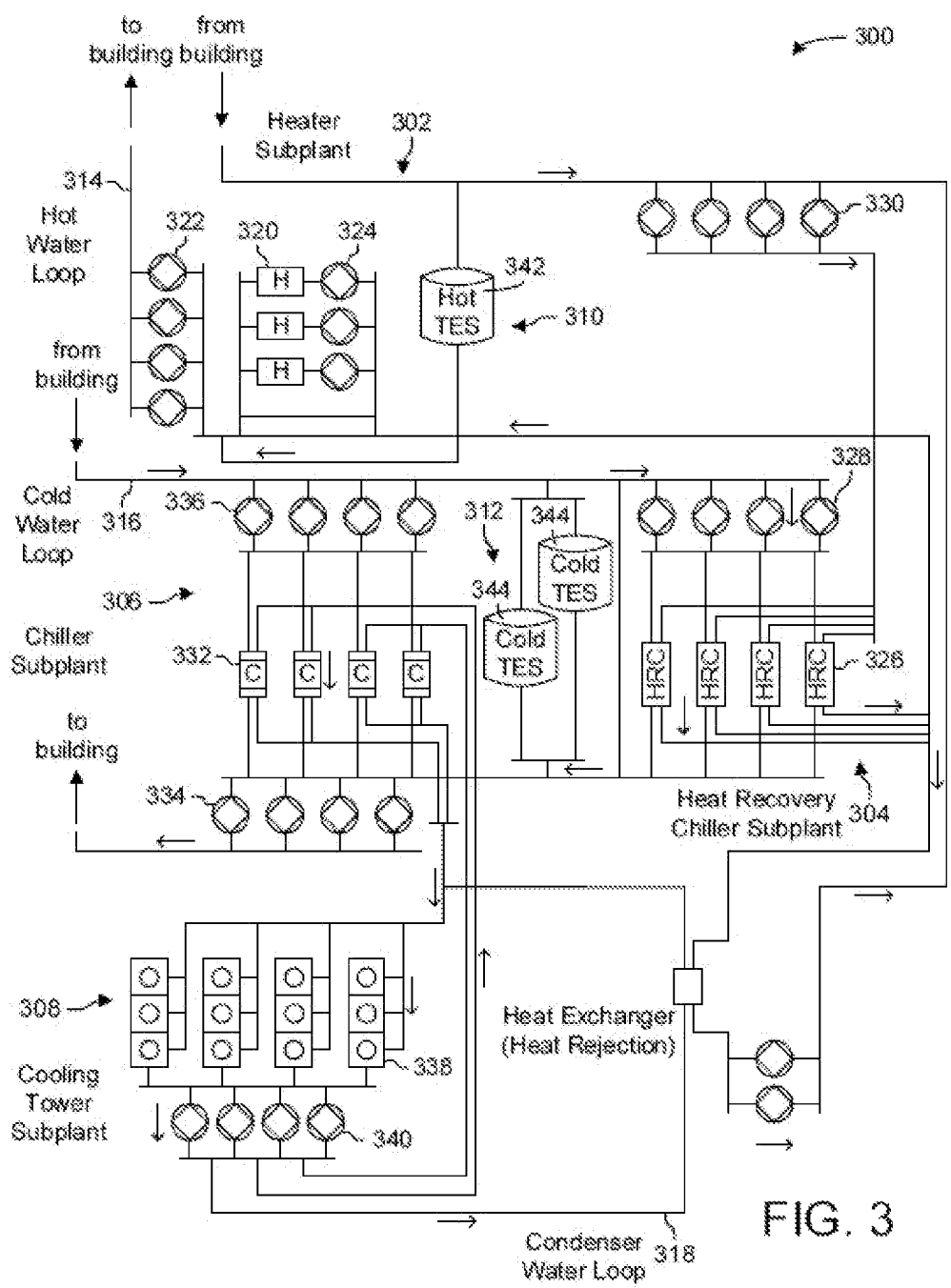
FIG. 3 is a block diagram of a waterside system, according to an exemplary embodiment.
Figure 4:
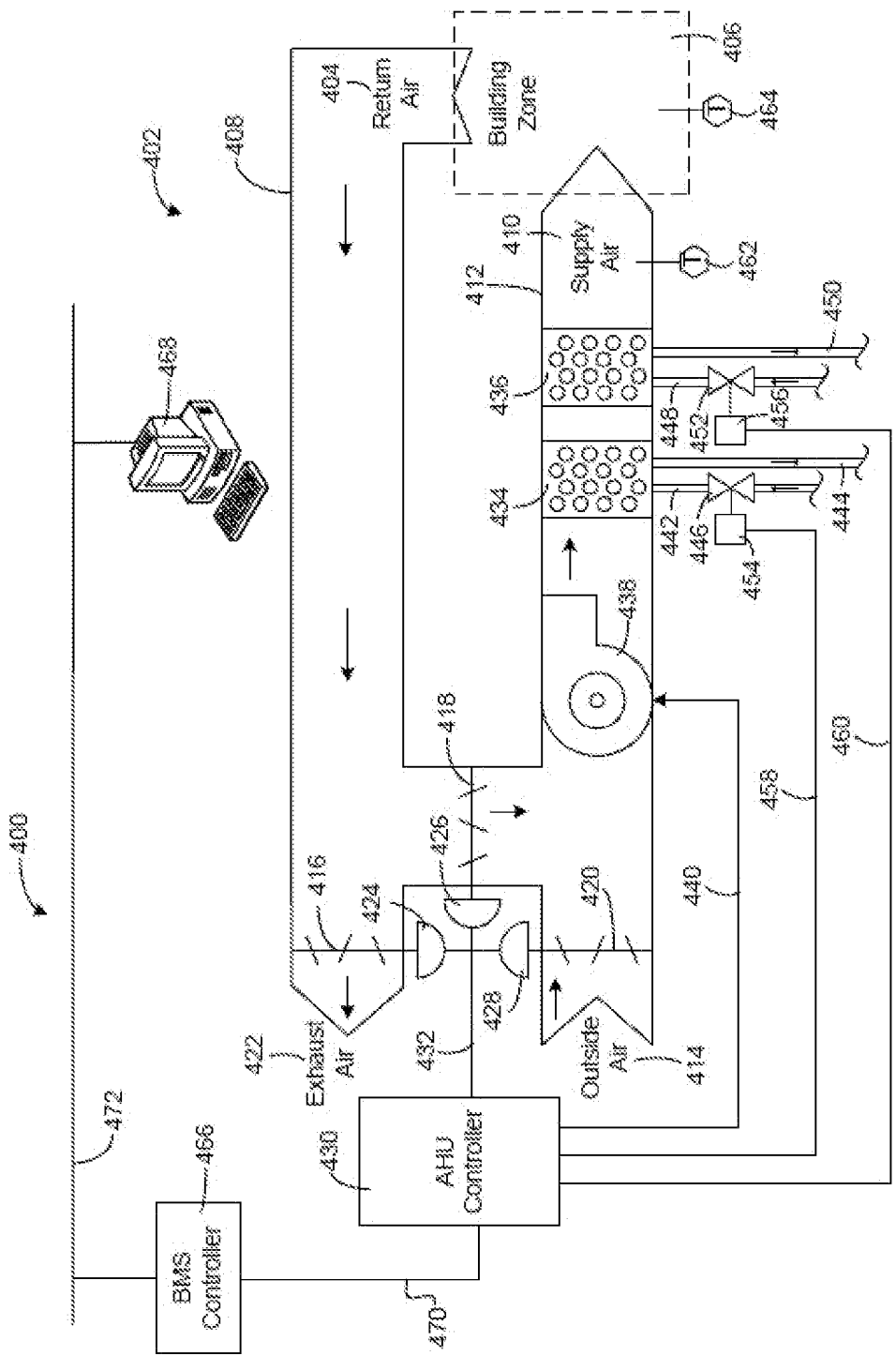
FIG. 4 is a block diagram of an airside system, according to an exemplary embodiment.
Figure 5:
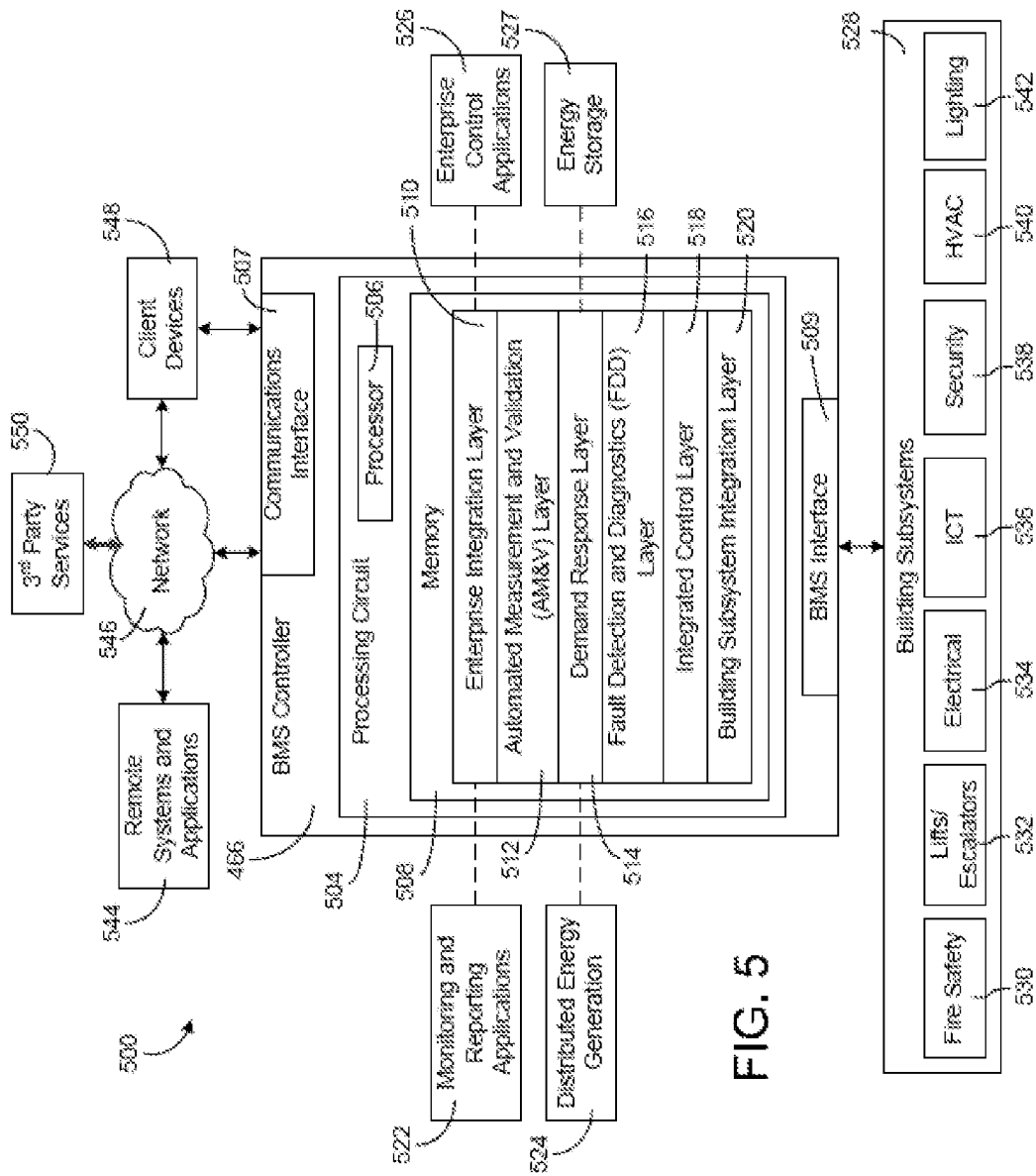
FIG. 5 is a block diagram of a building management system, according to an exemplary embodiment.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 210, 220, 230, and 140 as shown in FIG. 1, or may be any other suitable building that is communicatively connected to building management platform 102. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Building and HVAC System

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, 3$^{rd}$ party services 550, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine improved and/or optimal control actions for building subsystems 528 based on the inputs, generate control signals based on the improved and/or optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to improve and/or optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine a improved and/or optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated super system. In some embodiments, integrated control layer 518 includes control logic that uses inputs and outputs from building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels.

For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Building Management System With Search Suggestion Platform

Figure 6:
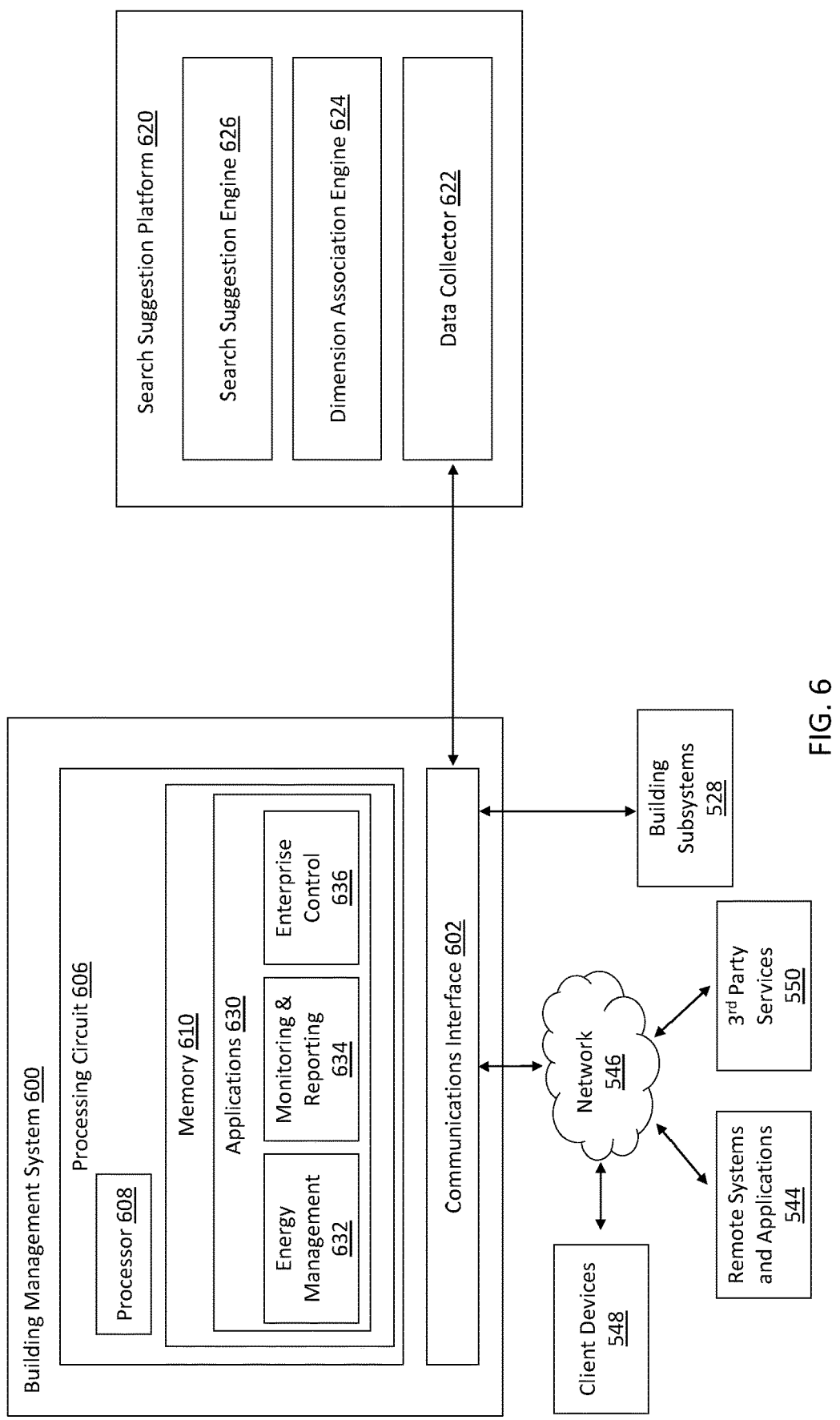
FIG. 6 is a block diagram of another building management system including a search suggestion platform, according to an exemplary embodiment.

Referring now to FIG. 6, a block diagram of another building management system (BMS) 600 is shown, according to some embodiments. BMS 600 can be configured to collect data samples from client devices 548, remote systems and applications 544, $3^{rd}$ party services 550, and/or building subsystems 528, and provide the data samples to a search suggestion platform 620 to provide persona-adjusted search suggestions from the data samples. In accordance with some embodiments, search suggestion platform 620 may supplement or replace building management platform 102 shown in FIG. 1 or can be implemented separate from building management platform 102. Search suggestion platform 620 can process the data samples to generate one or more persona-adjusted search suggestions. In some embodiments, search suggestion platform 620 can include a data collector 622, a dimension association engine 624, and a search suggestion engine 626, which shall be respectively described in detail below.

Each of the above-mentioned elements or components is implemented in hardware, or a combination of hardware and software, in one or more embodiments. Each component of the building management system 600 (including the search suggestion platform 620) may be implemented using hardware or a combination of hardware or software. For instance, each of these elements or components can include any application, program, library, script, task, service, process or any type and form of executable instructions executing on hardware of a client device. The hardware includes circuitry such as one or more processors in one or more embodiments.

It should be noted that the components of BMS 600 and/or search suggestion platform 620 can be integrated within a single device (e.g., a supervisory controller, a BMS controller, etc.) or distributed across multiple separate systems or devices. In other embodiments, some or all of the components of BMS 600 and/or search suggestion platform 620 can be implemented as part of a cloud-based computing system configured to receive and process data from one or more building management systems. In other embodiments, some or all of the components of BMS 600 and/or search suggestion platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 (or cloud building management platform 620) can include many of the same components as BMS 500 (e.g., processing circuit 504, processor 506, and/or memory 508), as described with reference to FIG. 5. For example, BMS 600 is shown to include a communications interface 602 (including the BMS interface 509 and the communications interface 507 from FIG. 5). Interface 602 can include wired or wireless communications interfaces (e.g., jacks, antennas, transmitters, receivers, transceivers, wire terminals, etc.) for conducting data communications with client devices 548, remote systems and applications 544, $3^{rd}$ party services 550, building subsystems 528 or other external systems or devices. Communications conducted via interface 602 can be direct (e.g., local wired or wireless communications) or via a communications network 546 (e.g., a WAN, the Internet, a cellular network, etc.).

Communications interface 602 can facilitate communications between BMS 600, Cloud building management platform services 620, building subsystems 528, client devices 548 and external applications (e.g., remote systems and applications 544 and $3^{rd}$ party services 550) for allowing user control, monitoring, and adjustment to BMS 600. BMS 600 can be configured to communicate with building subsystems 528 using any of a variety of building automation systems protocols (e.g., BACnet, Modbus, ADX, etc.). In some embodiments, BMS 600 receives data samples from building subsystems 528 and provides control signals to building subsystems 528 via interface 602. In some embodiments, BMS 600 receives data samples from the $3^{rd}$ party services 550, such as, for example, weather data from a weather service, news data from a news service, documents and other document-related data from a document service, media (e.g., video, images, audio, social media, etc.) from a media service, and/or the like, via interface 602 (e.g., via APIs or any suitable interface).

Building subsystems 528 can include building electrical subsystem 534, information communication technology (ICT) subsystem 536, security subsystem 538, HVAC subsystem 540, lighting subsystem 542, lift/escalators subsystem 532, and/or fire safety subsystem 530, as described with reference to FIG. 5. In various embodiments, building subsystems 528 can include fewer, additional, or alternative subsystems. For example, building subsystems 528 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4. Each of building subsystems 528 can include any number of devices, controllers, and connections for completing its individual functions and control activities. Building subsystems 528 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Search suggestion platform 620 may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Data collector 622 of search suggestion platform 620 is shown receiving data samples from $3^{rd}$ party services 550 and building subsystems 528 via interface 602. However, the present disclosure is not limited thereto, and the data collector 622 may receive the data samples directly from the $3^{rd}$ party service 550 or the building subsystems 528 (e.g., via network 546 or via any suitable method). In some embodiments, the data samples include data values for various data points. The data values can be measured and/or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. A data sample received from a $3^{rd}$ party weather service can include both a measured data value (e.g., current temperature) and a calculated data value (e.g., forecast temperature). Data collector 622 can receive data samples from multiple different devices (e.g., IoT devices, sensors, etc.) within building subsystems 528, and from multiple different $3^{rd}$ party services (e.g., weather data from a weather service, news data from a news service, etc.) of the $3^{rd}$ party services 550. In some embodiments, the data can be time series data as provided in PCT Patent Application Serial Nos. PCT/US2018/052994 PCT/US2018/052974, incorporated herein by reference in their entireties.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 600 and/or search suggestion platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 622 adds timestamps to the data samples based on the times at which the data samples are received. Data collector 622 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 622 is as follows:

[<key,timestamp_1,value_1>,<key,timestamp_2, value_2>,<key,timestamp_3,value_3>]

where key is an identifier of the source of the raw data samples (e.g., timeseries ID, sensor ID, device ID, etc.), timestamp_i identifies the time at which the ith sample was collected, and value_i indicates the value of the ith sample.

Data collector 622 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 622 organizes the raw timeseries data. Data collector 622 can identify a system or device associated with each of the data points. For example, data collector 622 can associate a data point with a temperature sensor, an air handler, a chiller, or any other type of system or device. In some embodiments, a data entity may be created for the data point, in which case, the data collector 622 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 622 can then determine how that system or device relates to the other systems or devices in the building site from entity data. For example, data collector 622 can determine that the identified system or device is part of a larger system (e.g., a HVAC system) or serves a particular space (e.g., a particular building, a room or zone of the building, etc.) from the entity data. In some embodiments, data collector 622 uses or retrieves an entity graph when organizing the timeseries data.

Dimension association engine 624 of search suggestion platform 620 can maintain or otherwise manage respective profiles (e.g., roles/personae) of the users of search suggestion platform 620. Further, dimension association engine 624 can monitor, detect, or otherwise manage one or more other dimensions (e.g., a physical space, a page, asset(s), etc) of each of the users, and upon detecting the role of a user, dimension association engine 624 can associate at least one of the other dimensions with the role of the user. In response to associating at least one of the other dimensions with the role of the user, dimension association engine 624 can communicate with search suggestion engine 626 to receive corresponding data from data collector 622 and thus, provide one or more persona-adjusted search suggestions to the user.

Figure 7:
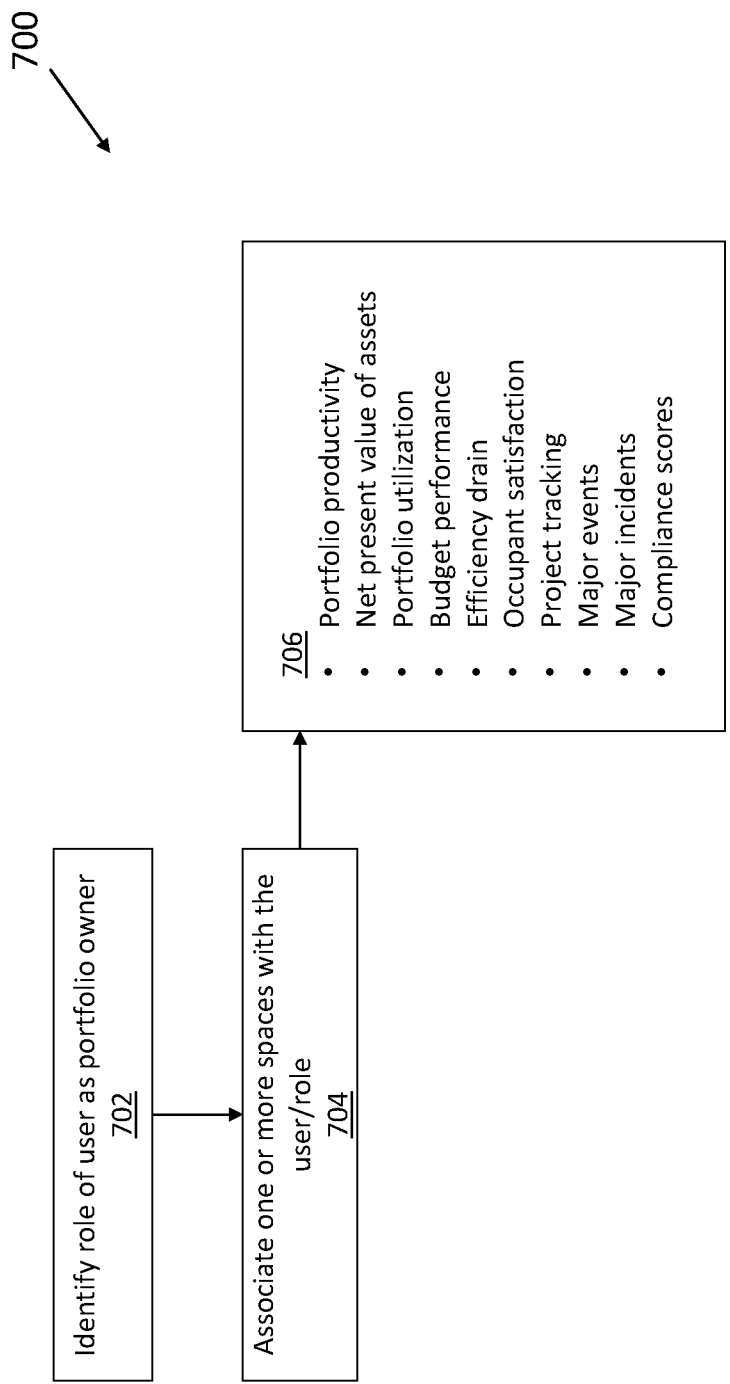
FIG. 7 is a process chart of a method performed by the search suggestion platform of FIG. 6, according to an exemplary embodiment.

FIG. 7 illustrates a process chart of an exemplary method 700 performed by search suggestion platform 620 to provide a number of search suggestions to a user. As shown, the method 700 starts with operation 702 in which search suggestion platform 620 identifies the role/persona of a user as a portfolio owner. In some embodiments, in response to the user logging into search suggestion platform 620, search suggestion platform 620 may identify the role of the user by associating credentials, provided by the user, with one or more profiles managed by search suggestion platform 620. Simultaneously with or subsequently to search suggestion platform 620 identifying the role of the user from the respective profile, search suggestion platform 620 can associate one or more physical spaces with the user or a user in such a role (operation 704). Examples of the associated physical space can include a space to which the user has accessed, a space to which a user in such role is allowed to access, and/or in which the user is currently located. In response to associating the role and physical space(s) with a logged-in user, the method 700 then proceeds to operation 706 to provide a number of search suggestions such as, for example, portfolio productivity (revenue), a net present value of assets, portfolio utilization, budget performance (planned vs. actual operating budgets), efficiency drain (monetized FDD), occupant satisfaction, project tracking, major events, major incidents, and compliance scores. In some embodiments, search suggestion platform 620 may present the search suggestions to the user upon detecting the user has moved a cursor into a search field, or present a subset of the search suggestions based on detecting at least a presence of a text match between the searched item that the user enters and one of the search suggestions.

Figure 8:
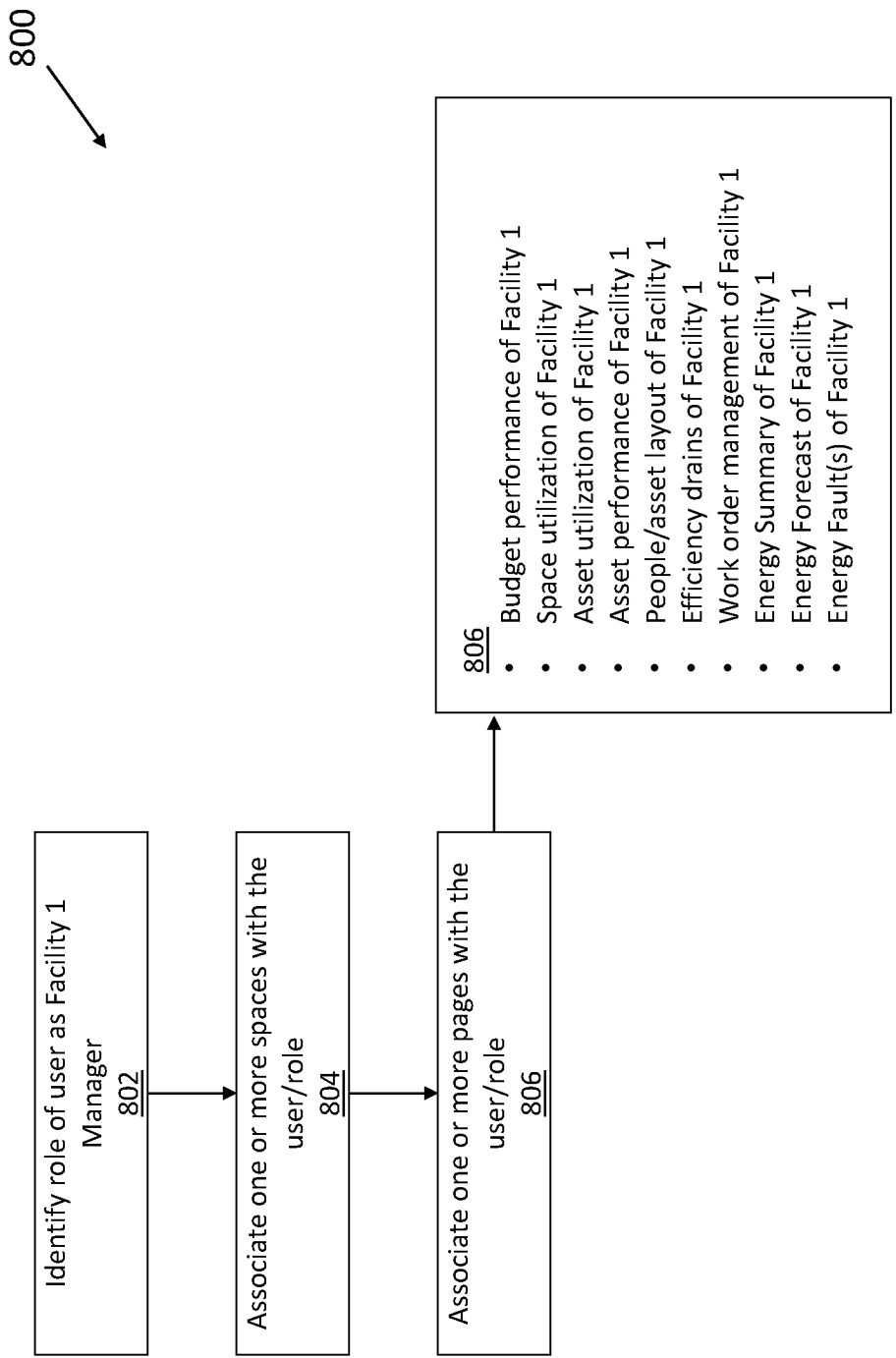
FIG. 8 is a process chart of another method performed by the search suggestion platform of FIG. 6, according to an exemplary embodiment.

FIG. 8 illustrates a process chart of an exemplary method 800 performed by search suggestion platform 620 to provide a number of search suggestions to a user. As shown, the method 800 starts with operation 802 in which search suggestion platform 620 identifies the role/persona of a user as Facility 1 Manager. In some embodiments, in response to the user logging into search suggestion platform 620, search suggestion platform 620 may identify the role of the user by associating credentials provided by the user with one or more profiles managed by search suggestion platform 620. Simultaneously with or subsequently to search suggestion platform 620 identifying the role of the user from the respective profile, search suggestion platform 620 can associate one or more physical spaces with the user or a user in such a role (operation 804). Examples of the associated physical space can include a space to which the user has accessed, a space to which a user in such role is allowed to access, and/or in which the user is currently located, e.g., Facility 1. Simultaneously with or subsequently to search suggestion platform 620 identifying the role, search suggestion platform 620 can associate one or more pages with the user or a user in the role (operation 806). Examples of the associated page can include a web page of a user interface which the user is currently viewing and a web page which a user in the role is allowed to view, e.g., Energy Summary. In response to associating the role, physical space(s), and page(s) with a logged-in user, the method 800 then proceeds to operation 808 to provide a number of search suggestions such as, for example, budget performance of Facility 1, space utilization of Facility 1, asset utilization of Facility 1, asset performance of Facility 1, a people/asset layout of Facility 1, efficiency drains of Facility 1, work order management of Facility 1, Energy Summary of Facility 1, Energy Forecast of Facility 1, and Energy Fault(s) of Facility 1. In some embodiments, search suggestion platform 620 may present the search suggestions to the user upon detecting the user has moved a cursor into a search field, or present a subset of the search suggestions based on detecting at least a presence of a text match between the searched item that the user enters and one of the search suggestions.

Figure 9:
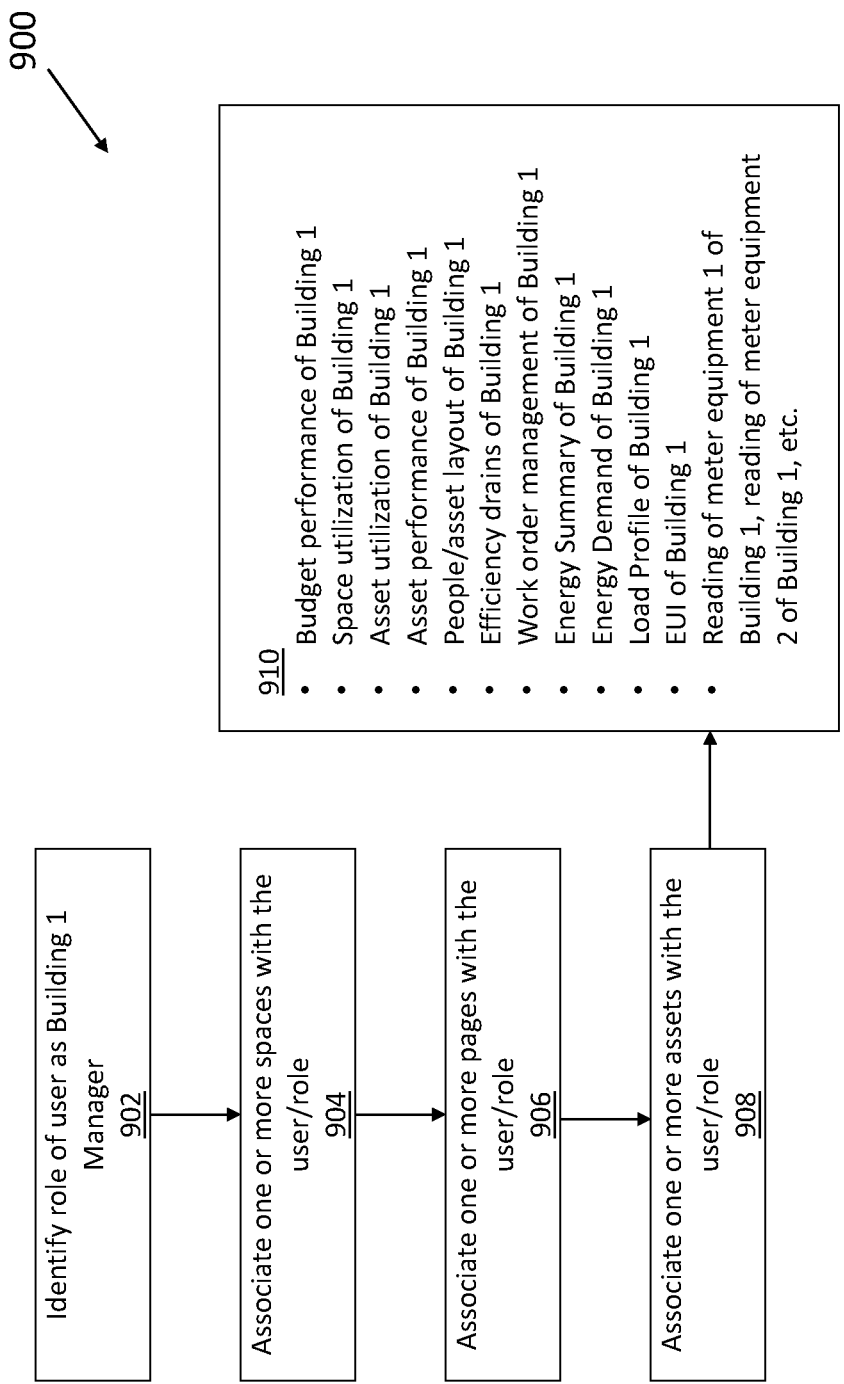
FIG. 9 is a process chart of yet another method performed by the search suggestion platform of FIG. 6, according to an exemplary embodiment.

FIG. 9 illustrates a process chart of an exemplary method 900 performed by search suggestion platform 620 to provide a number of search suggestions to a user. As shown, the method 900 starts with operation 902 in which search suggestion platform 620 identifies the role/persona of a user as Building 1 Manager. In some embodiments, in response to the user logging into search suggestion platform 620, search suggestion platform 620 may identify the role of the user by associating credentials provided by the user with one or more profiles managed by search suggestion platform 620. Simultaneously with or subsequently to search suggestion platform 620 identifying the role of the user from the respective profile, search suggestion platform 620 can associate one or more physical spaces with the user or a user in such a role (operation 904). Examples of the associated physical space can include a space to which the user has accessed, a space to which a user in such role is allowed to access, and/or in which the user is currently located, e.g., Building 1. Simultaneously with or subsequently to search suggestion platform 620 identifying the role, search suggestion platform 620 can associate one or more pages with the user or a user in the role (operation 906). Examples of the associated page can include a web page of a user interface which the user is currently viewing and a web page which a user in the role is allowed to view, e.g., Energy View. Simultaneously with or subsequently to search suggestion platform 620 identifying the physical space of the user, search suggestion platform 620 can associate one or more assets within the associated physical space with the user or a user in the role (operation 908), e.g., meter equipment 1, 2, 3, 4, 5, 6, 7, 8, 9, and/or 10. In response to associating the role, physical space(s), page(s), and asset(s) with a logged-in user, the method 900 then proceeds to operation 910 to provide a number of search suggestions such as, for example, budget performance of Building 1, space utilization of Building 1, asset utilization of Building 1, asset performance of Building 1, efficiency drains of Building 1, work order management of Building 1, Energy Summary of Building 1, Energy Demand of Building 1, Load Profile of Building 1, EUI of Building 1, and the reading of meter equipment 1 of Building 1, the reading of meter equipment 2 of Building 1, and so on. In some embodiments, search suggestion platform 620 may present the search suggestions to the user upon detecting the user has moved a cursor into a search field, or present a subset of the search suggestions based on detecting at least a presence of a text match between the searched item that the user enters and one of the search suggestions.

Figure 10:
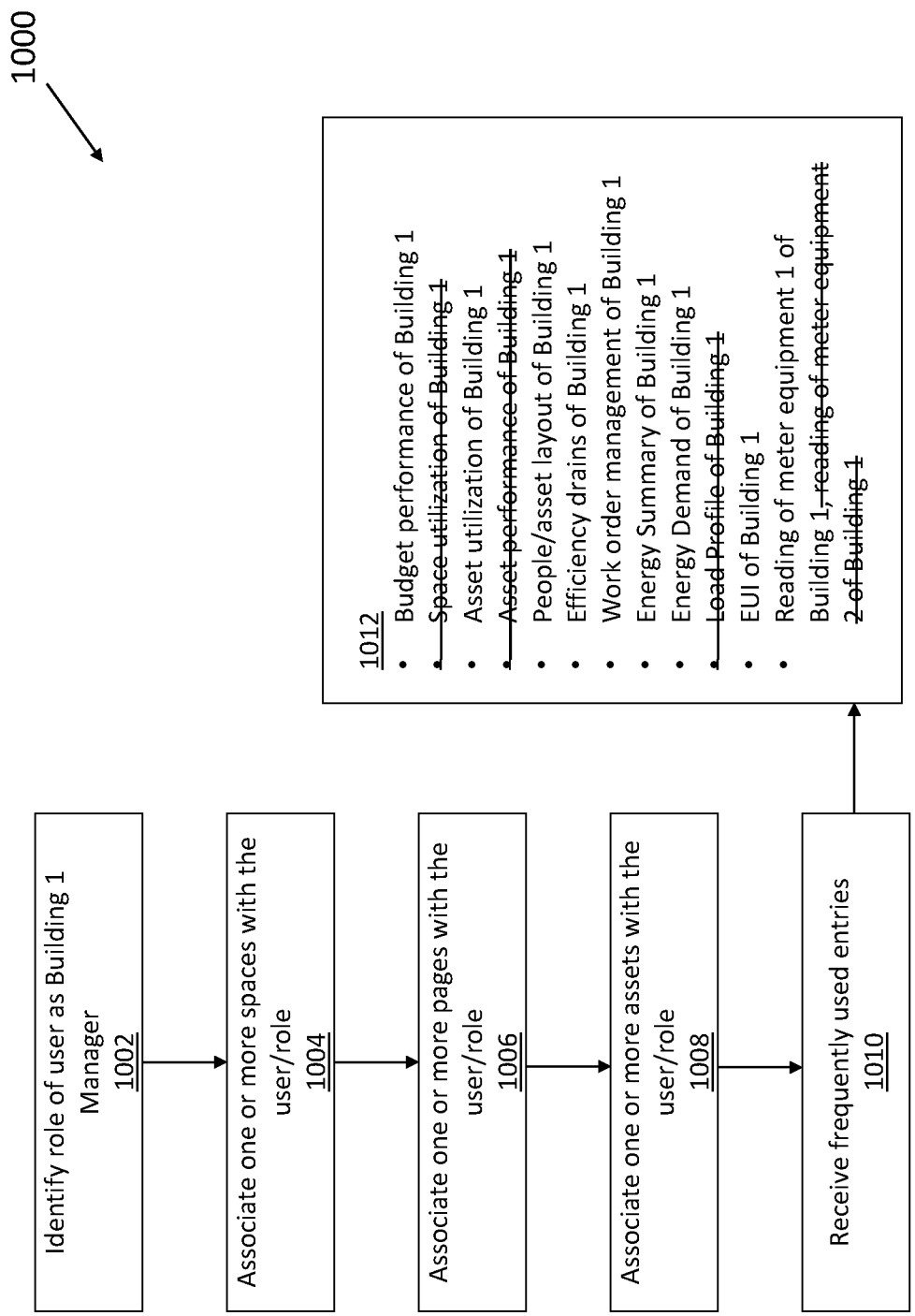
FIG. 10 is a process chart of yet another method performed by the search suggestion platform of FIG. 6, according to an exemplary embodiment.

FIG. 10 illustrates a process chart of an exemplary method 1000 performed by search suggestion platform 620 to provide a number of search suggestions to a user. As shown, the method 1000 starts with operation 1002 in which search suggestion platform 620 identifies the role/persona of a user as Building 1 Manager. In some embodiments, in response to the user logging into search suggestion platform 620, search suggestion platform 620 may identify the role of the user by associating credentials provided by the user with one or more profiles managed by search suggestion platform 620. Simultaneously with or subsequently to search suggestion platform 620 identifying the role of the user from the respective profile, search suggestion platform 620 can associate one or more physical spaces with the user or a user in such a role (operation 1004). Examples of the associated physical space can include a space to which the user has accessed, a space to which a user in such role is allowed to access, and/or in which the user is currently located, e.g., Building 1. Simultaneously with or subsequently to search suggestion platform 620 identifying the role, search suggestion platform 620 can associate one or more pages with the user or a user in the role (operation 1006). Examples of the associated page can include a web page of a user interface which the user is currently viewing and a web page which a user in the role is allowed to view, e.g., Energy View. Simultaneously with or subsequently to search suggestion platform 620 identifying the physical space of the user, search suggestion platform 620 can associate one or more assets within the associated physical space with the user or a user in the role (operation 1008), e.g., meter equipment 1, 2, 3, 4, 5, 6, 7, 8, 9, and/or 10. Additionally or alternatively, search suggestion platform 620 can receive one or more frequently used entries to refine (e.g., filter) the search suggestions (operation 1010). In response to associating the role, physical space(s), page(s), and asset(s) with a logged-in user and receiving the frequently used entries, the method 1000 then proceeds to operation 1012 to provide a number of search suggestions such as, for example, budget performance of Building 1, asset utilization of Building 1, efficiency drains of Building 1, work order management of Building 1, Energy Summary of Building 1, Energy Demand of Building 1, EUI of Building 1, and the reading of meter equipment 1 of Building 1 with space utilization of Building 1, asset performance of Building 1, Load Profile of Building 1, and the reading of meter equipment 2 of Building 1 filtered out. In some embodiments, search suggestion platform 620 may present the search suggestions to the user upon detecting the user has moved a cursor into a search field, or present a subset of the search suggestions based on detecting at least a presence of a text match between the searched item that the user enters and one of the search suggestions.

In some embodiments, prior to or concurrently with presenting the search suggestions, search suggestion platform 620 can also present one or more faults associated with the identified role of the user on a user interface. Based on the identified role of the user and/or one or more of the associated physical space, page, and asset, search suggestion platform 620 can identify the one or more faults through analytics and/or fault detection and diagnostics (FDD) performed by the building management system 600 and one or more communicatively coupled components (e.g., processing circuit 606, remote systems and applications 544, 3$^{rd}$ party services 550, search suggestion platform 620, etc.).

Figure 11:
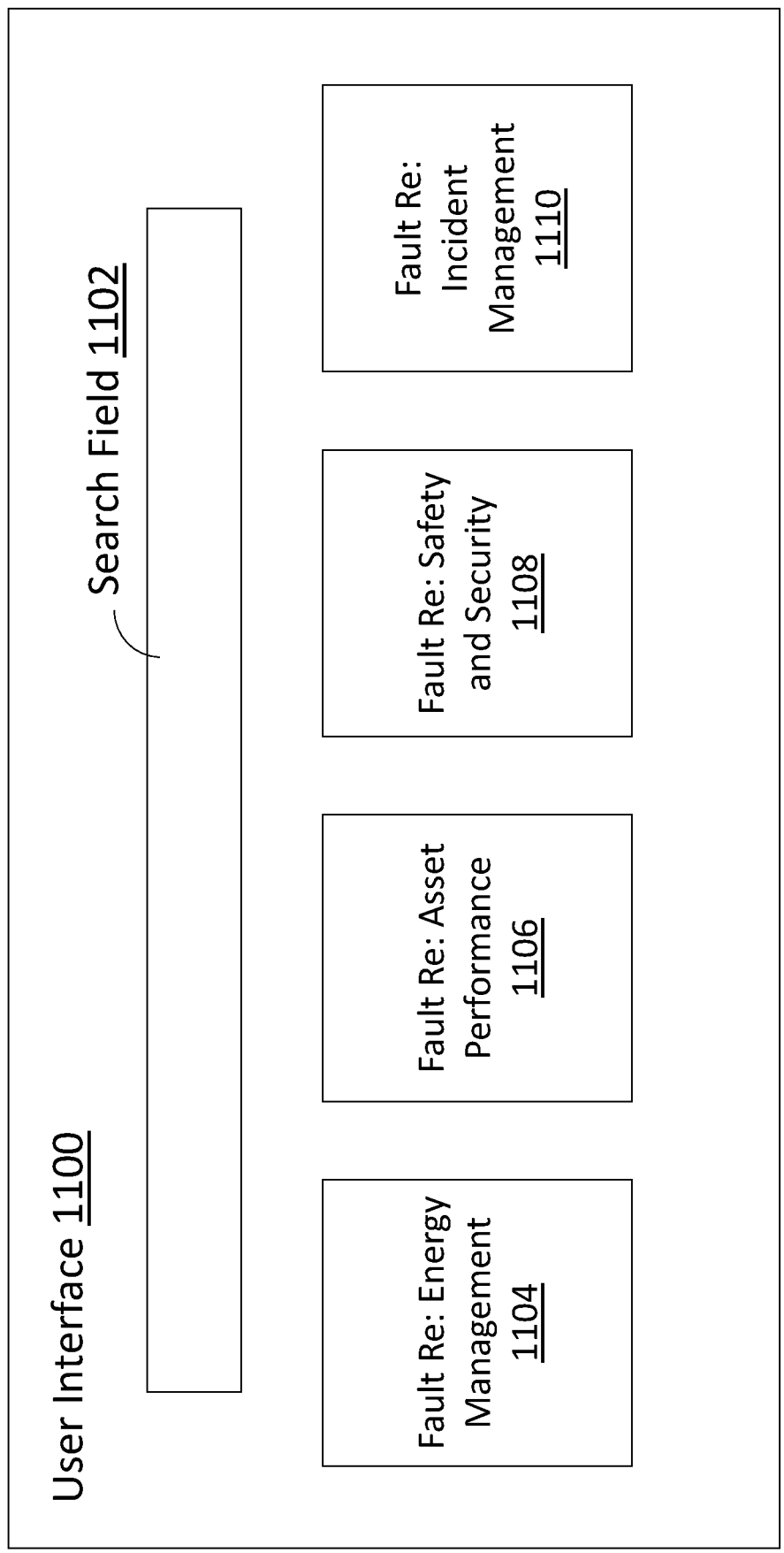
FIG. 11 is a user interface provided by the search suggestion platform of FIG. 6 to display one or more faults, according to an exemplary embodiment.

FIG. 11 provides an exemplary user interface 1100 of search suggestion platform 620 that displays a number of faults associated with the role of a user prior to presenting any search suggestion to the user. As shown, the user interface 1100, including a search field 1102, displays a first fault regarding energy management of a particular building associated with the role of the user and/or one or more of the associated physical space, page, and asset (1104), a second fault regarding asset performance of a particular equipment device associated with the role of the user and/or one or more of the associated physical space, page, and asset (1106), a third fault regarding safety and security associated with the role of the user and/or one or more of the associated physical space, page, and asset (1108), and a fourth fault regarding incident management associated with the role of the user and/or one or more of the associated physical space, page, and asset (1110). In some embodiments, such displayed faults 1104-1110 may each include one or more interactable items. For example, in response to detecting that one of the faults is engaged (e.g., clicked), search suggestion platform 620 may direct the user to one or more search suggestions associated with the engaged fault and/or present the user with one or more selectable items to perform a search.

Referring to FIG. 12, depicted is a flow diagram of one embodiment of a method 1200 for providing one or more persona-adjusted search suggestions. The functionalities of the method 1200 can be implemented using, or performed by, the components detailed herein in connection with FIGS. 1-11. For example, search suggestion platform 620 may perform the operations of the method 1200 to provide users, associated with one or more buildings managed by BMS 600, with one or more persona-adjusted search suggestions.

In brief overview, a search suggestion platform can detect authentication credentials of a user at operation 1202. At operation 1204, the search suggestion platform can identify a role (or persona) of the user. At operation 1206, the search suggestion platform can associate the role with one or more physical spaces, web pages, and/or assets. At operation 1208, the search suggestion platform can filter data associated with one or more buildings. At operation 1210, the search suggestion platform can detect an input focus. In response to detecting the input focus, at operation 1212, the search suggestion platform can display one or more search suggestions. On the other hand, in response to detecting no input focus, the method 1200 may proceed again to operation 1210 until an input focus is detected.

Still referring to FIG. 12, and in further detail, the search suggestion platform can detect, monitor, or otherwise identify a presence of authentication credentials of a user at operation 1202. In some embodiments, the search suggestion platform may determine the presence of authentication credentials of a user by detecting that the user has provided respective authentication credentials to log into (a network application) of the search suggestion platform presented through a user interface (e.g., user interface 1100). In response to detecting the authentication credentials, the search suggestion platform may compare the detected authentication credentials with a set of stored or managed authentication credentials, respectively associated with one or more users of the search suggestion platform, to determine whether the detected authentication credentials are valid. For example, the search suggestion platform may determine that the detected authentication credentials are valid based on identifying a match between the detected authentication credentials and one or more of the stored authentication credentials.

In response to detecting the authentication credentials of the user, the search suggestion platform may identify a role (or persona) of the user at operation 1204. In some embodiments, the search suggestion platform may maintain, store, or otherwise manage the respective profiles of the users of the search suggestion platform. Such a profile of a user may include a role of the user within an organization, a department within the organization to which the user belongs, and/or one or more physical spaces to which the user are authorized to access. By accessing the profile of the user using the user's authentication credentials, the search suggestion platform can identify a role of the user. In response to identifying the role, the search suggestion platform can further identify the duty for the organization associated with the role and one or more primary key performance indicators (KPIs) in which a user in such a role may be interested.

Next, at operation 1206, the search suggestion platform can associate the role with one or more physical spaces, web pages, and/or assets. The search suggestion platform may communicate with one or more applications, client devices, services, and/or building subsystems to associate the identified role with one or more physical spaces, web pages, and/or assets. In some embodiments, the search suggestion platform may use the duty and/or KPIs corresponding to the role to associate the role with at least one of a physical space, a web page, and/or an asset. For example, the search suggestion platform can communicate with at least one of the above-described entities to associate the role with one or more physical spaces to which the user (whose authentication credentials are detected by search suggestion platform) has accessed or the role is allowed to access, and/or a physical space in which the user is currently located, as described with respect to the method 700 of FIG. 7. In another example, the search suggestion platform can communicate with at least one of the above-described entities to associate the role with one or more web pages which the user (whose authentication credentials are detected by search suggestion platform) is currently viewing, and/or one or more web pages which the role is allowed to view, as described with respect to the method 800 of FIG. 8. In yet another example, the search suggestion platform can communicate with at least one of the above-described entities to associate the role with one or more assets within the associated physical space which the user (whose authentication credentials are detected by search suggestion platform) is currently inspecting, using, or otherwise managing, and/or one or more assets within the associated physical space which the role is allowed to inspect, use, or otherwise manage, as described with respect to the method 900 of FIG. 9.

In response to associating with the role with at least one of a physical space, a web page, and an asset, the search suggestion platform can filter data associated with one or more buildings at operation 1208. Such data may include various data structures, queries, readings, and statistics associated with the buildings that the BMS manages. According to some embodiments, the search suggestion platform can access the data and generate a matrix using the role and one or more of the associated physical space, web page, and asset to filter the data. In some embodiments, the search suggestion platform may use one or more entities frequently used by the user through the user interface to further filter the data.

Next, at operation 1210, the search suggestion platform can detect whether an input focus is present on an input element of the user interface of the search suggestion platform. For example, the search suggestion platform may detect whether one or more searched items have been present in a search filed of the user interface (e.g., the user has inputted a searched item in the search field). If so, the search suggestion platform may display the filtered data as the search suggestions through the user interface (operation 1212); and if not, the search suggestion platform may continue detecting a presence of the searched items being inputted to the search field (operation 1210). In another example, the search suggestion platform may detect whether a cursor has been present in the search field for a certain period of time and determine whether the period of time has exceeded a predefined threshold (e.g., 5 seconds). Similarly, if so, the search suggestion platform may display the filtered data as the search suggestions through the user interface (operation 1212); and if not, the search suggestion platform may continue detecting a presence of the searched items being inputted to the search field (operation 1210).

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method, comprising:
   identifying a role of a user that is associated with one or more duties and performance indicators for one or more buildings;
   associating the role of the user with a physical space of a plurality of physical spaces and an application of a plurality of applications, the application including an interface displaying data of a first type, the plurality of applications including interfaces displaying data of a plurality of types of data;
   receiving a search from a user device of the user via a search interface, the search including unstructured text indicating data associated with the one or more buildings;
   generating a plurality of search recommendations based on the search and the role of the user being associated with the physical space and the application, the plurality of search recommendations identifying the data of the first type of the application for the physical space;
   causing the search interface to include the plurality of search recommendations;
   retrieving a data set based on at least one of the plurality of search recommendations and filtering the data set based on the role of the user, the physical space, and the application by removing or omitting space data of other physical spaces of the plurality of physical spaces and other types of data of the plurality of types of data from the data set to generate search result data that includes data of the first type for the physical space; and
   displaying the search result data on a user interface to the user.

2. The method of claim 1, further comprising detecting a presence of authentication credentials of the user inputted to the user interface to identify the role of the user.

3. The method of claim 1, further comprising detecting an input focus on an input element of the user interface to display the data.

4. The method of claim 3, wherein the input focus includes one or more searched items corresponding to one or more search suggestions of the search result data.

5. The method of claim 3, wherein the input focus includes a presence of a cursor, the method further comprise detecting the presence of the cursor that has stayed in the input element for a length of time greater than a predefined threshold.

6. The method of claim 1, further comprising:
   associating one or more faults with the role of the user, the physical space, or the application; and
   displaying the one or more faults on the user interface prior to displaying the search result data.

7. The method of claim 1, further comprising filtering the data based on one or more frequently used entries associated with the user.

8. A computing device comprising:
   a memory; and
   one or more processors operatively coupled to the memory, the one or more processors configured to:
      identify a role of a user that is associated with one or more duties and performance indicators for one or more buildings;
      associate the role of the user with a physical space of a plurality of physical spaces and an application of a plurality of applications, the application including an interface displaying data of a first type, the plurality of applications including interfaces displaying data of a plurality of types of data;
      receive a search from a user device of the user via a search interface, the search including unstructured text indicating data associated with the one or more buildings;
      generate a plurality of search recommendations based on the search and the role of the user being associated with the physical space and the application, the plurality of search recommendations identifying the data of the first type of the application for the physical space;
      cause the search interface to include the plurality of search recommendations;
      retrieve a data set based on at least one of the plurality of search recommendations and filter the data set based on the role of the user, the physical space, and the application by removing or omitting space data of other physical spaces of the plurality of physical spaces and other types of data of the plurality of types of data from the data set to generate search result data that includes data of the first type for the physical space; and display the search result data on a user interface to the user.

9. The computing device of claim 8, wherein the one or more processors are further configured to detect a presence of authentication credentials of the user inputted to the user interface to identify the role of the user.

10. The computing device of claim 8, wherein the one or more processors are further configured to detect an input focus on an input element of the user interface to display the data.

11. The computing device of claim 10, wherein the input focus includes one or more searched items correspond to the search result data.

12. The computing device of claim 10, wherein the input focus includes a presence of a cursor, the one or more processors are configured to detect the presence of the cursor that has stayed in the input element for a length of time greater than a predefined threshold.

13. The computing device of claim 8, wherein the one or more processors are further configured to:
associate one or more faults with the role of the user, the physical space, or the application; and
display the one or more faults on the user interface prior to displaying the search result data.

14. A non-transitory computer readable medium storing program instructions for causing one or more processors to:
identify a role of a user that is associated with one or more duties and performance indicators for one or more buildings;
associate the role of the user with a physical space of a plurality of physical spaces and an application of a plurality of applications, the application including an interface displaying data of a first type, the plurality of applications including interfaces displaying data of a plurality of types of data;
receive a search from a user device of the user via a search interface, the search including unstructured text indicating data associated with the one or more buildings;
generate a plurality of search recommendations based on the search and the role of the user being associated with the physical space and the application, the plurality of search recommendations identifying the data of the first type of the application for the physical space;
cause the search interface to include the plurality of search recommendations;
retrieve a data set based on at least one of the plurality of search recommendations and filter the data set based on the role of the user, the physical space, and the application by removing or omitting space data of other physical spaces of the plurality of physical spaces and other types of data of the plurality of types of data from the data set to generate search result data that includes data of the first type for the physical space; and
display the search result data on a user interface to the user.

15. The non-transitory computer readable medium of claim 14, wherein the program instructions further causes the one or more processors to detect a presence of authentication credentials of the user inputted to the user interface to identify the role of the user.

16. The non-transitory computer readable medium of claim 14, wherein the program instructions further causes the one or more processors to detect an input focus on an input element of the user interface to display the data.

17. The non-transitory computer readable medium of claim 16, wherein the input focus includes one or more searched items correspond to the search result data.

18. The non-transitory computer readable medium of claim 16, wherein the input focus includes a presence of a cursor, the program instructions further cause the one or more processors to detect the presence of the cursor that has stayed in the input element for a length of time greater than a predefined threshold.

19. The non-transitory computer readable medium of claim 14, wherein the program instructions further causes the one or more processors to:
associate one or more faults with the role of the user, the physical space, or the application; and
display the one or more faults on the user interface prior to displaying the search result data.

20. The non-transitory computer readable medium of claim 14, wherein the program instructions further causes the one or more processors to filter the data based on one or more frequently used entries associated with the user.

* * * * *